US008751881B1

(12) United States Patent
Terry et al.

(10) Patent No.: US 8,751,881 B1
(45) Date of Patent: Jun. 10, 2014

(54) TRANSMISSION BUFFER UNDER-RUN PROTECTION

(75) Inventors: John M. Terry, San Jose, CA (US); Jan Bialkowski, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 506 days.

(21) Appl. No.: 12/614,243

(22) Filed: Nov. 6, 2009

(51) Int. Cl.
*G06F 11/00* (2006.01)

(52) U.S. Cl.
USPC .......................................... 714/708; 714/799

(58) Field of Classification Search
USPC .................................................. 714/708, 799
See application file for complete search history.

(56) References Cited

U.S. PATENT DOCUMENTS

| 5,206,933 | A * | 4/1993 | Farrell et al. | 709/250 |
| 5,778,175 | A * | 7/1998 | Paul et al. | 709/250 |
| 6,119,207 | A * | 9/2000 | Chee | 711/158 |
| 6,757,348 | B1 * | 6/2004 | Vila et al. | 375/372 |
| 7,418,007 | B1 * | 8/2008 | Liu et al. | 370/468 |
| 7,826,488 | B2 * | 11/2010 | Lanzone et al. | 370/498 |
| 7,886,073 | B2 * | 2/2011 | Gahm et al. | 709/231 |
| 7,886,090 | B2 * | 2/2011 | Alankry et al. | 710/53 |
| 2005/0044321 | A1 * | 2/2005 | Bialkowski et al. | 711/118 |
| 2006/0224659 | A1 * | 10/2006 | Yu | 709/201 |
| 2009/0169218 | A1 * | 7/2009 | Nonaka et al. | 398/154 |
| 2010/0199152 | A1 * | 8/2010 | Ver Steeg | 714/776 |
| 2011/0004700 | A1 * | 1/2011 | Sprague et al. | 709/236 |
| 2011/0004802 | A1 * | 1/2011 | Bialkowski et al. | 714/752 |

* cited by examiner

*Primary Examiner* — Bryce Bonzo
*Assistant Examiner* — Elmira Mehrmanesh
(74) *Attorney, Agent, or Firm* — Shun Yao; Park, Vaughan, Fleming & Dowler LLP

(57) ABSTRACT

One embodiment of the present invention provides a system that facilitates transmission buffer under-run protection. During operation, the system stores bits of a data frame in a transmission buffer associated with an output port. The system also monitors the state of the transmission buffer and commences transmission of the data frame to the output port prior to complete reception of the data frame in the transmission buffer. The system further determines that the amount of data stored in the transmission buffer is below a predetermined threshold and inserts a number of predetermined unique bit sequences after the partially transmitted data frame, thereby allowing a receiving device to temporarily suspend reception of the data frame and resume reception at a later time without dropping the data frame.

27 Claims, 8 Drawing Sheets

TRANSMISSION BUFFER UNDER-RUN PROTECTION

BACKGROUND

1. Field

The present disclosure relates to communication networks. More specifically, the present disclosure relates to a method and system for facilitating transmission buffer under-run protection.

2. Related Art

The proliferation of the Internet and e-commerce continues to fuel evolutions in the telecom and network industries. Convergence in the underlying network architectures often takes place at a pace faster than the lifespan of most network equipment. For example, a large enterprise network today may contain Internet Protocol (IP) networks, storage area networks (SANs), Ethernet-based access networks, and leased lines and switches from telephone service providers. How to manage and fully utilize the equipment capacity in a heterogeneous environment remains an ongoing challenge.

To maximize returns on capital expenditures, many network architects prefer re-using existing equipment to switch data packets of different formats and aggregating low-speed switch ports to provision high-speed logical links. Equipment vendors often provide the capability of mix-and-matching the latest edge equipment with existing core equipment to boost switching capacity and accommodate different types of traffic.

In such heterogeneous networks, to maintain low data transfer latency, switching equipment and/or edge devices often employ cut-through switching, where data frames are transmitted to an output port before it is entirely received at the transmission buffer. Such configuration sometimes can result in buffer under-run situations, where the transmission buffer is depleted before the end of the data frame is received. Transmission buffer under-run could lead to dropped frames and impair service quality.

SUMMARY

In embodiments of the present invention, the problem of transmission buffer under-run is solved by inserting special idle bit sequences within a data frame, which allows a receiving device to suspend reception of an incoming data frame without dropping the frame.

One embodiment of the present invention provides a system that facilitates transmission buffer under-run protection. During operation, the system stores bits of a data frame in a transmission buffer associated with an output port. The system also monitors the state of the transmission buffer and commences transmission of the data frame to the output port prior to complete reception of the data frame in the transmission buffer. The system further determines that the amount of data stored in the transmission buffer is below a predetermined threshold and inserts a number of predetermined unique bit sequences after the partially transmitted data frame, thereby allowing a receiving device to temporarily suspend reception of the data frame and resume reception at a later time without dropping the data frame.

In a variation on this embodiment, the transmission buffer is a first-in-first-out (FIFO) buffer. Furthermore, the system fetches the data frame from a central shared memory prior to storing bits of the data frame in the transmission buffer.

In a variation on this embodiment, the receiving device is a Fibre Channel (FC) switch. The system encapsulates the data frame based on an FC frame format.

In a variation on this embodiment, the system attaches a sequence number to the data frame and prevents the predetermined unique bit sequence from intersecting the sequence number.

In a variation on this embodiment, the system resumes transmission of the data frame after sufficient data is received at the transmission buffer.

In a variation on this embodiment, the system allows a high-priority data frame to preempt the data frame. In doing so, the system interrupts transmission of the data frame being transmitted and inserts one or more predetermined unique bit sequences after the interrupted data frame, thereby allowing the receiving device to suspend reception of the data frame. The system then transmits the high-priority data frame and resumes transmission of the interrupted data frame after the transmission of the high-priority data frame is complete.

One embodiment of the present invention provides a system that facilitates transmission buffer under-run protection. During operation, the system receives bits of a data frame from a transmitting device. Upon identifying one or more predetermined unique bit sequences in the received bits, the system temporarily suspends error-checking calculation for the data frame, thereby suspending reception of the data frame without dropping the data frame. The system then resumes reception of the data frame and the corresponding error-checking calculation upon identifying a received bit sequence for the data frame which is not the predetermined unique bit sequence.

In one variation on this embodiment, the system receives a beginning-of-frame bit sequence after the identified predetermined unique bit sequence(s), wherein the beginning-of-frame bit sequence corresponds to a high-priority frame which is different from the data frame the reception of which is suspended. The system then receives the high-priority data frame prior to resuming reception of the suspended data frame.

BRIEF DESCRIPTION OF THE FIGURES

This disclosure is illustrated by way of example and not by way of limitation in the accompanying drawings. Like reference numerals refer to similar elements.

DETAILED DESCRIPTION

Figure 1:
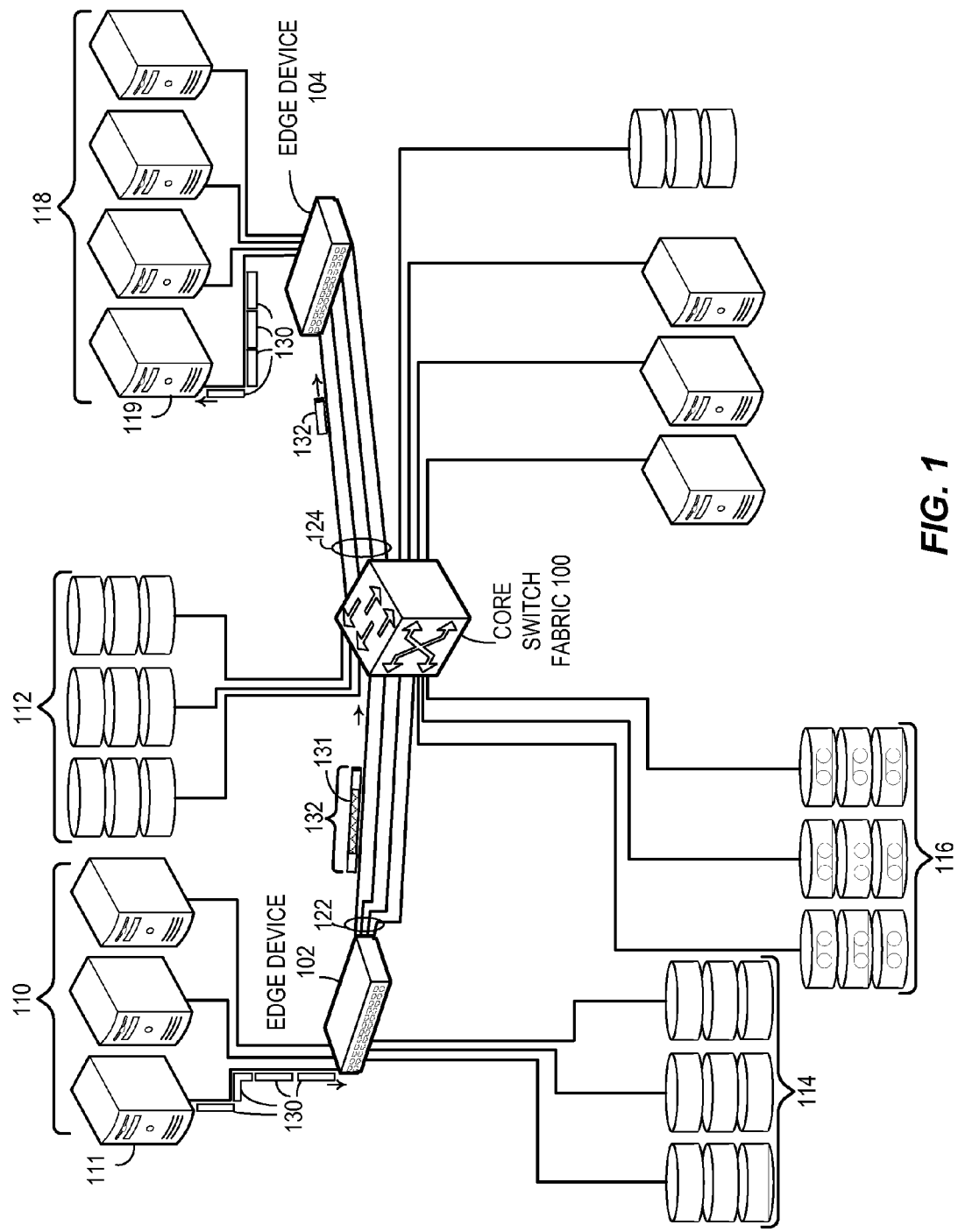
FIG. 1 illustrates an exemplary network that provides transmission buffer under-run protection, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a new type of edge device that solves the transmission buffer under-run problem in a multi-path switched network by inserting special idle bit sequences within a data frame that is being transmitted. As a result, a receiving device can temporarily suspend reception of the incoming data frame and resume the reception at a later time.

This new edge device can be coupled with other switching devices and perform cut-through forwarding of incoming data frames. That is, an incoming data frame can be transmitted to an output port of the edge device toward the next-hop device while the tail of the frame is still being received at the edge device. Such cut-through forwarding can significantly reduce the latency incurred to a data frame, because it is no longer necessary to buffer the entire incoming data frame before transmitting it.

It is possible that an output port of an edge device operates at a faster data rate than an input port does. It could also occur that the data path from a central shared switch memory within the edge device to the output port is temporarily occupied by other traffic (for example, higher-priority data frames). In both cases, the data might not be stored in the transmission buffer corresponding to a given output port as fast as the output port can transmit it. When the content of the transmission buffer is depleted before the data frame can be completely transmitted, buffer under-run occurs. In embodiments of the present invention, the edge device monitors the amount of data stored in a transmission buffer, and inserts special, idle bit sequences when possible buffer under-run is detected. Correspondingly, the receive device can suspend reception of the incoming frame and wait for the end of the idle bit sequences before resuming the reception. As a result, the network can enjoy low latency data transfer and experience fewer dropped frames due to buffer under-run.

In this disclosure, the term "edge device" is loosely defined and in general refers to a network device that is situated between an end-user device and a switch or traffic aggregation equipment situated closer to the core of the network. An edge device can provide switching functions. A "core device" can be a switch or other network equipment situated between two edge devices. An "ingress edge device" refers to an edge device that accepts traffic from end devices and forwards the traffic to a core device. An "egress edge device" refers to an edge device that accepts traffic from a core device and forwards the traffic to end devices. An "ingress port" on a device refers to an input port, and an "egress port" refers to an output port. An "external port" on an edge device refers to a port (ingress or egress) that couples to an end device. A "fabric port" on an edge device refers to a port (ingress or egress) that couples to a core device.

"Intra-frame idle primitive" refers to a predetermined, unique bit sequence that can be inserted within a data frame and indicates idle periods. An intra-frame idle primitive can be a sequence based on open standards or a proprietary bit sequence. Furthermore, the buffer under-run protection techniques described herein are not limited to the network configuration illustrated in the figures. Such techniques can be applied in a variety of networks, on different networking layers, with different frame or packet formats. The buffer under-run protection techniques are also not limited to the edge devices described herein, but can be applied to any network equipment that uses a transmission buffer (such as switches or traffic aggregation/de-aggregation equipment, or end-station network interface adapters).

Network Architecture

Figure 2:
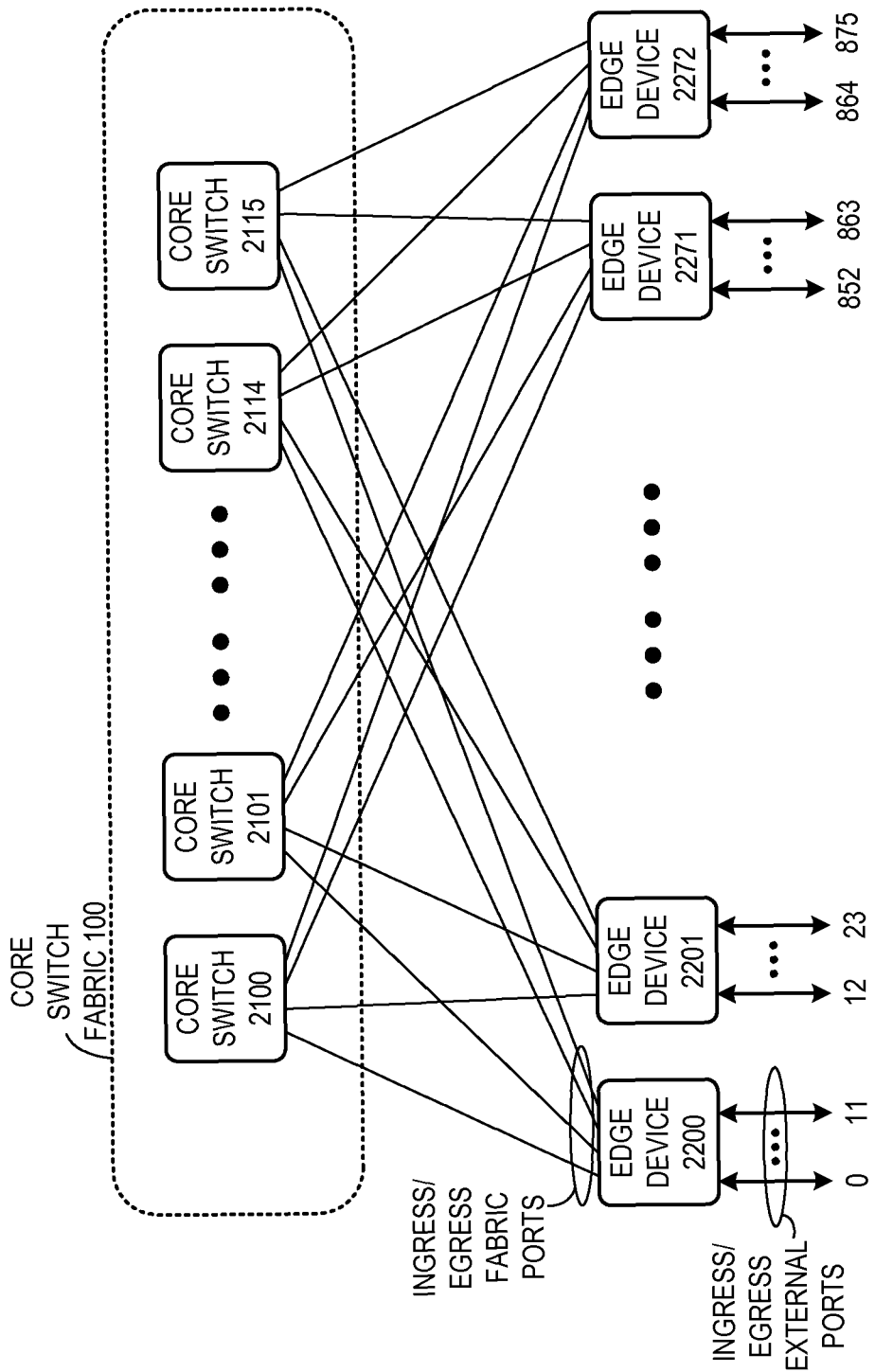
FIG. 2 illustrates an exemplary configuration of edge devices and a core switching device which facilitate transmission buffer under-run protection, in accordance with an embodiment of the present invention.

FIG. 1 illustrates an exemplary network that provides multi-path switching with transmission buffer under-run protection, in accordance with an embodiment of the present invention. In this example, an edge device 102 is coupled to a core switch fabric 100 via a number of links 122, and an edge device 104 is coupled to core switch fabric 100 via a number of links 124. Core switch fabric 100 can operate on a frame format that is the same as or different from the frame format of the external ports of edge devices 102 and 104. In one embodiment, core switch fabric 100 can operate on a Fibre Channel (FC) format, while edge devices 102 and 104 accept Ethernet frames from external devices. Furthermore, as illustrated in FIG. 2, core switch fabric 100 can include a number of switching devices, and data frames may traverse different paths via different switching devices within switch fabric 100.

In this example, a number of network appliances operating on an

FC frame format, such as back-up tape drives 116 and disk array 112, can be coupled to core switch 100. Core switch fabric 100 can switch traffic among these FC-based appliances. In addition, a number of Ethernet-based end devices, such as server farm 110, disk array 114, and server farm 118, are coupled to edge devices 102 and 104. The switching of traffic among these Ethernet-based devices is also performed by core switch fabric 100, because edge devices 102 and 104 can encapsulate an Ethernet frame within an FC frame.

As illustrated in FIG. 1, link group 122 includes multiple physical links (e.g., 4.25 Gbps or 8.5 Gbps FC links). Edge device 102 can use any physical link within link group 122 to transmit data frames which are to be switched by core switch fabric 100. Data frames destined to the same destination (e.g., server farm 118) can traverse different switched paths within core switch fabric 100 and be delivered at the destination. Similarly, edge device 104 can receive data frames from any physical link within link group 124 from core switch fabric 100. Note that edge devices 102 and 104 can each attach a sequence number to an Ethernet frame and encapsulate the Ethernet frame and the sequence number in FC headers. This feature allows an ingress edge device to "spray" the encapsulated frames across the physical links leading to different switched paths while still maintaining the frame order at the egress edge device.

In embodiments of the present invention, a respective edge device facilitates transmission buffer under-run protection for every output port, which can be either a fabric port or external port. During operation, the edge device monitors the amount of data stored in a respective transmission buffer. When the data stored in the buffer falls below a certain threshold, which indicates that buffer under-run is about to occur, the edge device inserts one or more intra-frame idle primitives, so that the output port can keep transmitting bits to the receiving device without disruption. On the receiving end, upon detecting the intra-frame idle primitive, the receiving device temporarily suspends the calculation of error- checking code (such as cyclic redundancy check, CRC) for the incoming frame.

The transmitting device can resume transmission of the data frame when the end of the frame is received in the transmission buffer. In further embodiments, the transmission can resume when sufficient data is received at the transmission buffer (for example, when the amount of buffered data is more than a second threshold), before the end of the frame is received at the buffer.

The edge device (or transmitting device in general) can also perform a procedure with the receiving device to determine whether the receiving device has the capability to handle intra-frame idle primitives. This procedure can be carried out during the boot-up process of either device. In the case where the receiving device is not configured to process intra-frame idle primitives, the edge device can turn off the buffer under-run protection. In further embodiments, the edge device can also have cut-through frame forwarding turned off and buffer entire frames before transmitting them, thus minimizing frame dropping at the cost of incurring more latency to the frames.

In the example in FIG. 1, assume that a server 111 in server farm 110 transmits a stream of Ethernet frames 130 e destined for a server 119 in server farm 118. As Ethernet frames 130 arrive at edge device 102, edge device 102 switches them to one or more output ports. Edge device 102 also encapsulates them with FC headers and optionally with additional header information. A respective frame, such as frame 132, is first fetched into a transmission buffer corresponding to an output port on edge device 102 (which is coupled to one of the links 122). Edge device 102 commences transmission of frame 132 before the entire frame is received at the transmission buffer. When possible buffer under-run is detected, i.e., when the amount of data for frame 132 stored in the transmission buffer is below a threshold, edge device 102 inserts a number of intra-frame idle primitives 131 after the portion of frame 132 that has been transmitted. At a later time, when the rest of frame 132 is received at the transmission buffer, the transmission is resumed.

As a result, frame 132 as transmitted to core switch fabric 100 appears longer than its original form, which intra-frame idle sequences 131 "sandwiched" between two portions of useful data of frame 132. Correspondingly, upon receiving intra-frame idle primitives 131, core switch fabric 100 suspends the reception of frame 132 and the CRC calculation, and resumes the reception at the end of intra-frame idle primitives 131. Subsequently, core switch fabric 100 re-assembles frame 132 and forwards it to edge device 104 on one of the links 124.

FIG. 2 illustrates an exemplary configuration of edge devices and a core switching device which facilitate multi-path switching with transmission buffer under-run protection, in accordance with an embodiment of the present invention. In this example, 73 edge devices 2200-2272 and 16 core switches 2100-2115 from a high-capacity switching system. Core switches 2100-2115 form an exemplary embodiment of core switch fabric 100 as illustrated in FIG. 1. Core switch fabric 100 may include additional switching devices, and some of the ports on these switching devices may be coupled to end devices, such as disk array 112 in the example illustrated in FIG. 1. In one embodiment, core switches 2100-2115 are FC switches. These core switches can also be based on other standard or proprietary frame format. Furthermore, each edge device has 12 external ports, which operate on the Ethernet frame format. In total, there are 876 external Ethernet ports, labeled as ports 0, 1, 2, ..., 875, respectively. A respective edge device also has 16 fabric ports, each of which couples to a different core switch. Correspondingly, a respective core switch has 73 ports, each coupling to a different edge device.

The links between the core switches and edge devices can be considered as "internal" links with respect to core switch fabric 100. In other words, the entire system, which includes core switch fabric 100 and edge devices 2200-2272, can appear to be one piece of network equipment (for example, placed in a single rack) to the outside world. The core switches serve as the back-end switch fabrics for forwarding traffic from an ingress external port to an egress external port. A data frame traveling from an ingress external port to an egress external port can take one of the 16 switched paths, each of which traverses one of the 16 core switches 2100-2115. Note that the terms "ingress" and "egress" are used here to indicate the direction of traffic flow. In reality, an external port can be bi-directional (for example, a Gigabit Ethernet (GbE) port or a 10G Ethernet port).

In one embodiment, a respective edge device can use all 16 fabric links (and correspondingly all 16 switched paths) for forwarding data frames to the same egress external port, independent of the frames' layer-2 or layer 3 addresses or layer-4 identifiers.

Each output port on a respective edge device can implement the transmission buffer under-run protection described herein, regardless of whether the output port is a fabric port (in which case the output port can operate on the FC frame format) or an external port (in which case the output port can operate on the Ethernet format). Furthermore, each output port on a respective edge device can automatically detect whether the receiving device (such as core switch 2100 or an external device) is capable of processing intra-frame idle primitives. When such capability is not available at the receiving device, the transmission buffer under-run protection mechanism can be optionally turned off.

Buffer Under-Run Protection

Figure 3A:
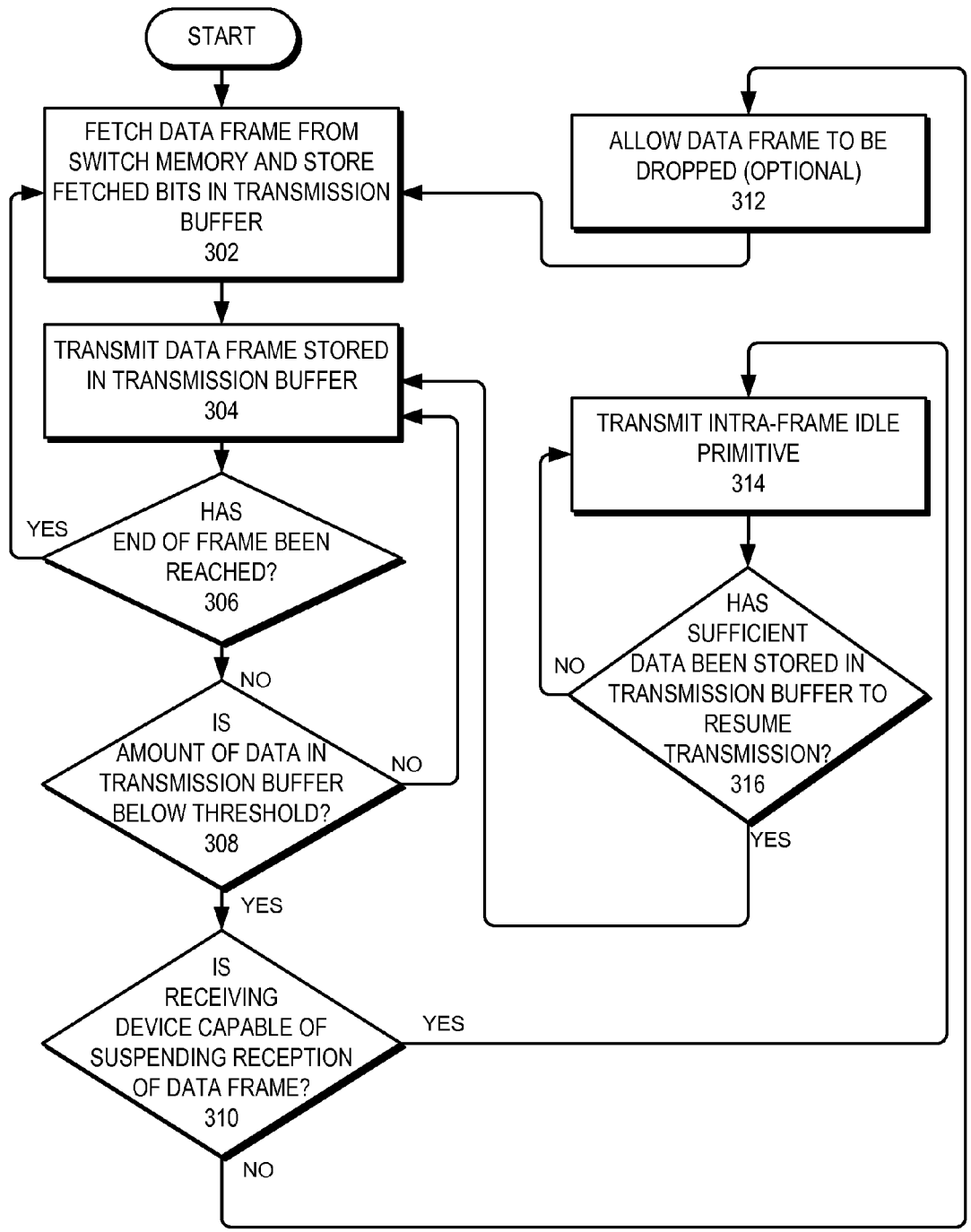
FIG. 3A presents a flow chart illustrating the process of inserting intra-frame idle primitives to prevent transmission buffer under-run, in accordance with an embodiment of the present invention.

FIG. 3A presents a flow chart illustrating the process of inserting intra-frame idle primitives to prevent transmission buffer under-run, in accordance with an embodiment of the present invention. In this example, it is assumed that an edge device includes a central, shared switch memory, where data frames are temporarily stored before they are forwarded to the output ports. During operation, a transmission buffer fetches a data frame from a switch memory and stores the fetched bits in the transmission buffer (operation 302). Subsequently, the stored bits are transmitted to the corresponding output port (operation 304). The system then determines whether the end of frame has been reached (operation 306). If so, the transmission buffer can fetch another data frame (operation 302). Otherwise, the system further determines whether the amount of data is below a predetermined threshold (operation 308). If there is sufficient amount of data, the system continues transmitting the buffered bits (operation 304).

If the amount of data in the buffer is below the threshold, the system further determines whether the receiving device is capable of handling intra-frame idle primitives and suspending reception of the data frame (operation 310). If such capability is not present on the receiving device, the system can allow the buffer under-run occur, and hence allow the data frame to be dropped (operation 312).

If the buffer under-run protection capability is available on the receiving device, the system transmits intra-frame idle primitives after the bits for the current data frame in the transmission buffer are depleted (operation 314). The system can then determine whether sufficient amount of data has been stored in the transmission buffer to resume transmission (operation 316), while continuously transmitting the intra-frame idle sequences (operation 314). When sufficient data has been received and stored in the transmission buffer, the system resumes the data frame transmission (operation 304).

Figure 3B:
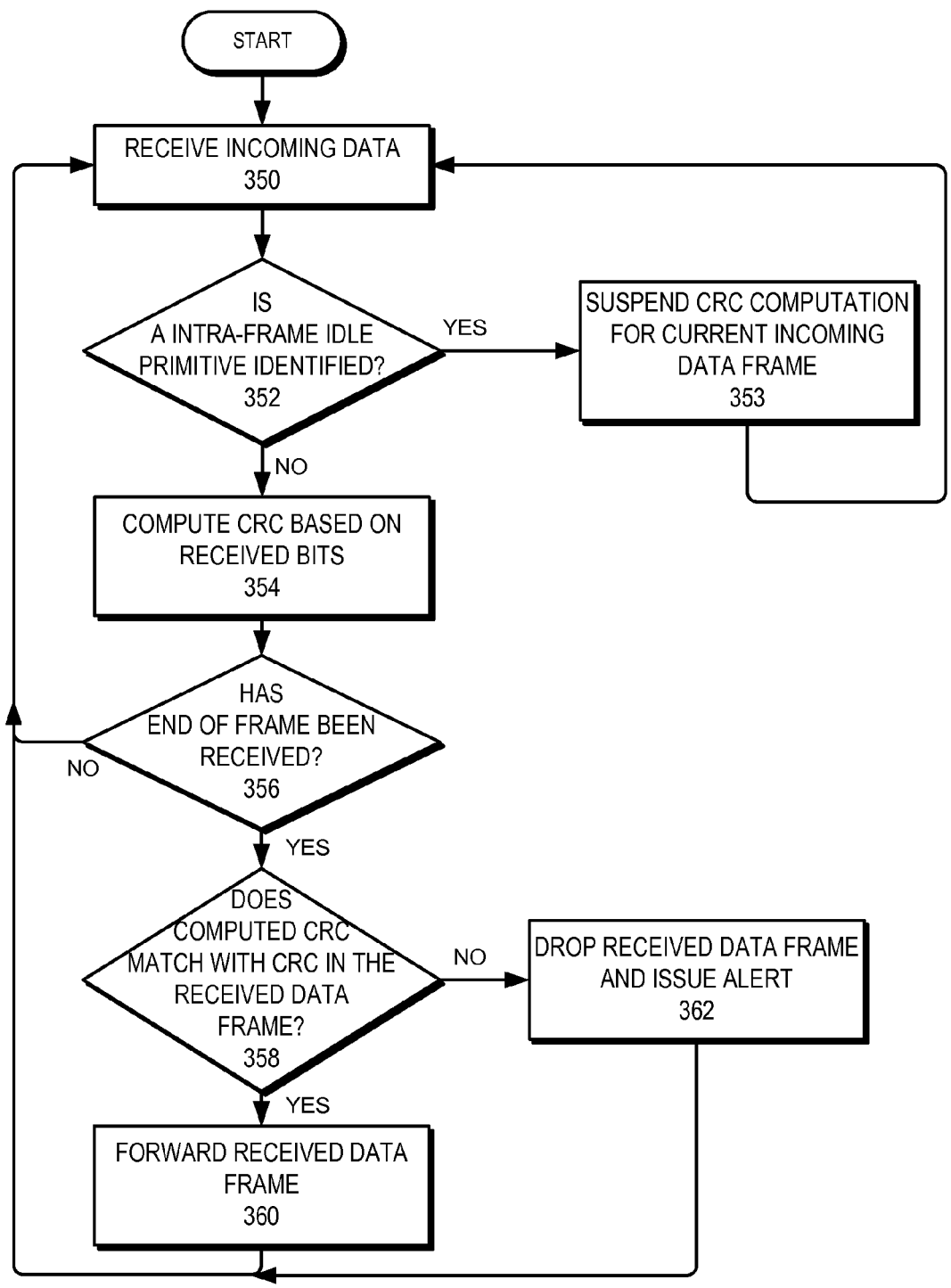
FIG. 3B presents a flow chart illustrating the process of suspending reception of a data frame in response to received intra-frame idle primitives, in accordance with an embodiment of the present invention.

FIG. 3B presents a flow chart illustrating the process of suspending reception of a data frame at a receiving device in response to received intra-frame idle primitives, in accordance with an embodiment of the present invention. During operation, the receiving device receives an incoming data frame (operation 350). The system then determines whether an intra-frame idle primitive has been identified (operation 352). If so, the system suspends the CRC computation for the current incoming data frame (operation 353), and continues to receive incoming data (operation 350).

Otherwise, the system computes the CRC based on the received bits (operation 354). The system further determines whether the end of frame has been received (operation 356). If not, the system continues receiving additional incoming data (operation 350). If the end of frame has been received, the system determines whether the computed CRC matches with the CRC carried in the received data frame (operation 358). If there is a match, the system forwards the received data frame to another module (for example, a routing module or a switch fabric within the receiving device) for further processing (operation 360). Otherwise, the system drops the received data frame and issues an alert (operation 362).

In some embodiments, a transmitting device can allow a high-priority frame to preempt a frame that is currently being transmitted. This can be accomplished by temporarily suspending transmission of the current frame, inserting intra-frame idle primitives to allow the receiving device to suspend reception, and transmit the high-priority frame. The receiving device can be configured in such a way that, when reception of the prior frame is suspended, if the incoming bits constitute the beginning of a new frame instead of the remaining portion of the prior frame, the receiving device can begin computing a new CRC for the new frame. At the same time, reception of the prior frame remains in suspension. After the high-priority frame is received, the transmitting device can resume transmitting the suspended frame.

Figure 3C:
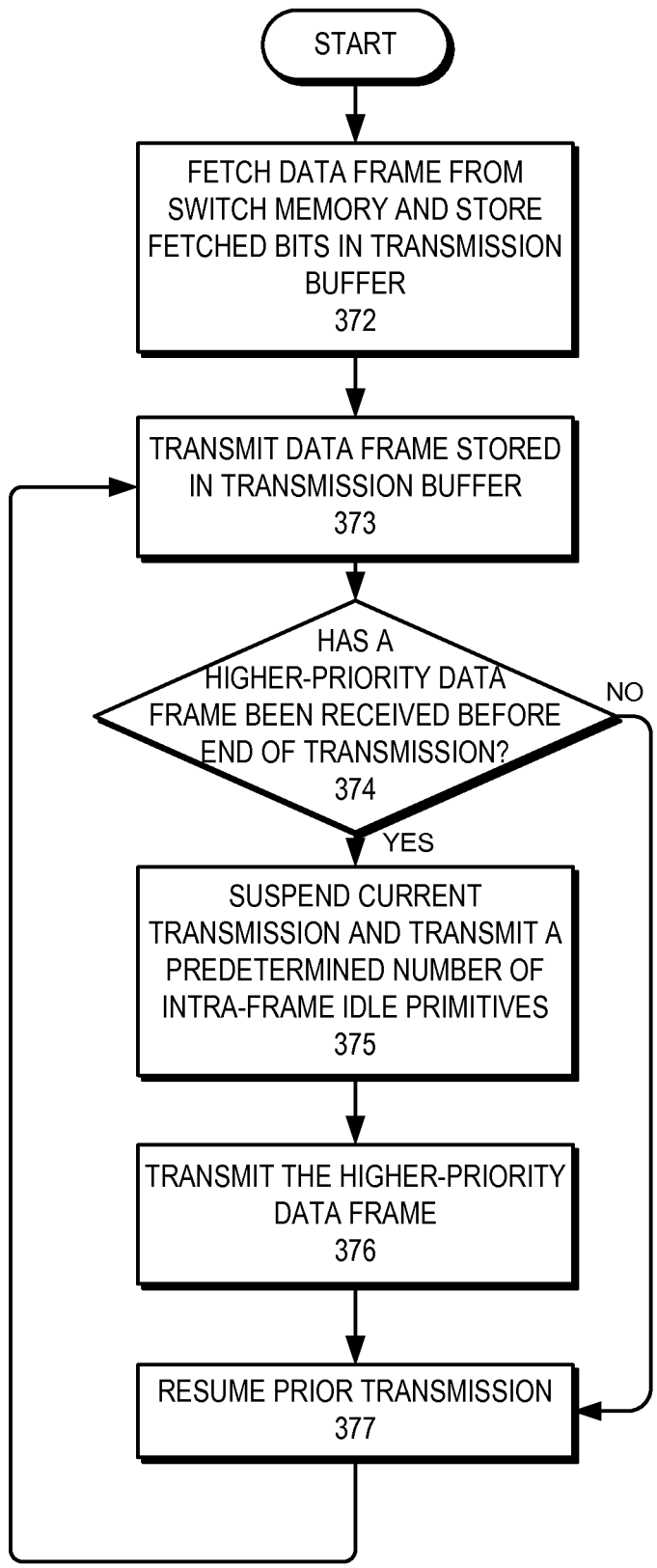
FIG. 3C presents a flow chart illustrating the process of inserting intra-frame idle primitives to allow a higher-priority data frame to preempt the transmission of a lower-priority data frame, in accordance with an embodiment of the present invention.

FIG. 3C presents a flow chart illustrating the process of inserting intra-frame idle primitives to allow a higher-priority data frame to preempt the transmission of a lower-priority data frame, in accordance with an embodiment of the present invention. During operation, a transmission buffer fetches a data frame from a switch memory and stores the fetched bits in the transmission buffer (operation 372). Subsequently, the stored bits are transmitted to the corresponding output port (operation 373).

The system then determines whether a higher-priority frame has been received before the end of the transmission of the current frame (operation 374). If so, the system suspends the transmission of the current frame and starts to transmit a predetermined number of intra-frame idle primitives (operation 375). Subsequently, the system transmits the higher-priority data frame, while the transmission of the prior frame is being suspended (operation 376). After transmission of the higher-priority frame is complete, the system resumes the prior transmission (operation 377).

Figure 3D:
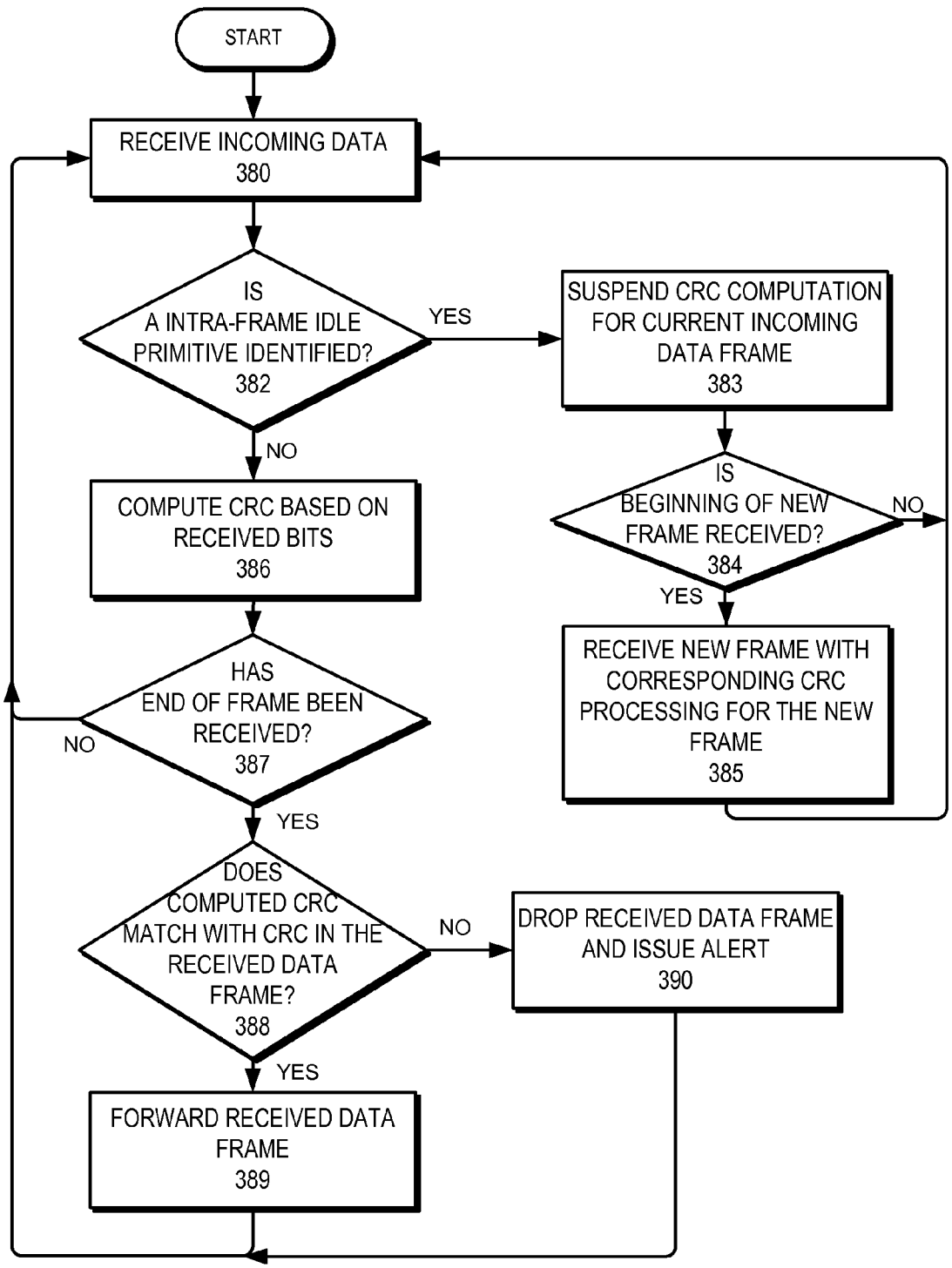
FIG. 3D presents a flow chart illustrating the process of receiving a higher-priority data frame which has preempted the transmission of a lower-priority data frame, in accordance with an embodiment of the present invention.

FIG. 3D presents a flow chart illustrating the process of receiving a higher-priority data frame which has preempted the transmission of a lower-priority data frame, in accordance with an embodiment of the present invention. During operation, the receiving device receives an incoming data frame (operation 380). The system then determines whether an intra-frame idle primitive has been identified (operation 382). If so, the system suspends the CRC computation for the current incoming data frame (operation 383). The system further determines whether the beginning of a new, high-priority frame is received (operation 384). If so, the system receives the new frame with the corresponding CRC processing for the new frame (operation 385), before continuing to receive further incoming data (operation 380).

If no intra-frame idle primitive has been identified, the system computes the CRC based on the received bits (operation 386). The system further determines whether the end of frame has been received (operation 387). If not, the system continues receiving additional incoming data (operation 380). If the end of frame has been received, the system determines whether the computed CRC matches with the CRC carried in the received data frame (operation 388). If there is a match, the system forwards the received data frame to another module (for example, a routing module or a switch fabric within the receiving device) for further processing (operation 389). Otherwise, the system drops the received data frame and issues an alert (operation 390).

Frame Format

Figure 4:
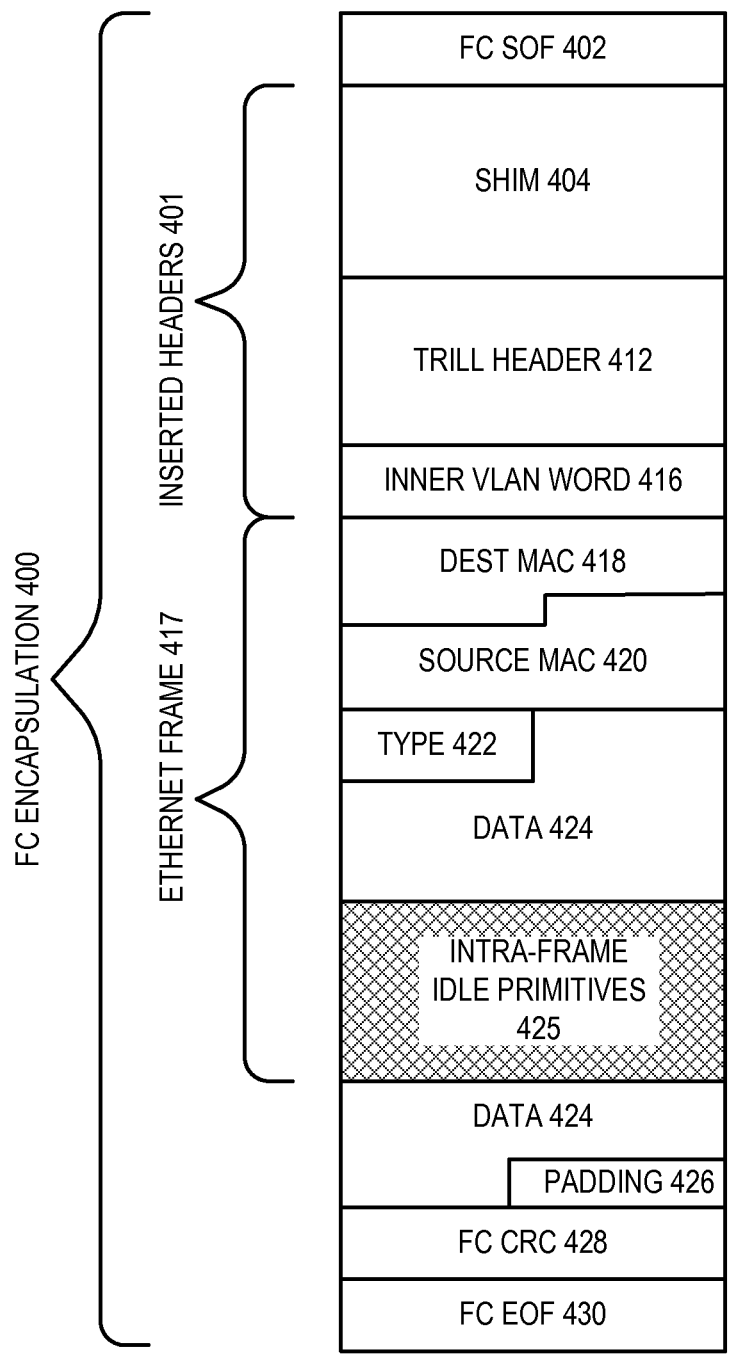
FIG. 4 illustrates an exemplary frame format which includes shim headers and accommodates inserted intra-frame idle primitives, in accordance with an embodiment of the present invention.

FIG. 4 illustrates an exemplary frame format which includes shim headers and accommodates inserted intra-frame idle primitives, in accordance with an embodiment of the present invention. In this example, it is assumed that the edge device encapsulates Ethernet frames in FC format and attaches sequence numbers to the data frames to ensure in-order delivery when multi-path switching is employed. Correspondingly, an FC-encapsulated frame 400 includes the FC headers, a number of inserted headers 401, and an Ethernet frame 417. The FC headers include an FC start-of-frame field 402, an FC checksum (cyclic-redundancy-check, or "CRC") field 428, and an FC end-of-frame field 430. The encapsulated Ethernet frame 417 can include a destination Medium Access Control (MAC) address 418, a source MAC address 420, an Ethertype field 422, Ethernet data 424, and a padding field 426.

Inserted headers 401 include a shim header 404 and, optionally, a

TRILL (Transparent Interconnection of Lots of Links) header 412 and an inner virtual LAN (VLAN) word 416. Shim header 404 can include a sequence number which is used by the edge devices to re-order received frames. Shim header 404 can include additional information to facilitate the routing and forwarding operations at the core FC switch. In one embodiment, shim header 404 includes FC address information. Note that the core switching devices can be based on other formats than FC. Correspondingly, shim header 404 can include routing information associated with different formats.

TRILL header 412 can facilitate link-state routing with Ethernet frames. More details of the TRILL protocol can be found at http://www.ietf.org/html.charters/trill-charter.html. VLAN word 416 allows various end devices to form a virtual LAN. Note that both TRILL header 412 and VLAN word 416 are optional.

In some embodiments, data portion 424 of Ethernet frame 417 can encapsulate Fibre Channel over Ethernet (FCoE) content. In this case, Ethertype field 422 carries a special value that indicates that the content in data field 424 carries an encapsulated FC frame. Note that the FCoE in data field 424 is separate from FC encapsulation 400.

Also shown in FIG. 4 is a number of intra-frame idle primitives 425 inserted within data field 424. An intra-frame idle primitive can be a unique Ethernet ordered set that represents idle. It can also take a proprietary bit sequence, as long as the receiving device can recognize it. Furthermore, depending on when the buffer under-run occurs, the intra-frame idle primitive can be placed in different locations within FC encapsulation 400. In one embodiment, the transmitting device is precluded from inserting intra-frame idle primitives between the bits corresponding to a frame sequence number, thereby preserving the proper frame order at the receiving device and the egress edge device.

Operation of Edge Device

Figure 5:
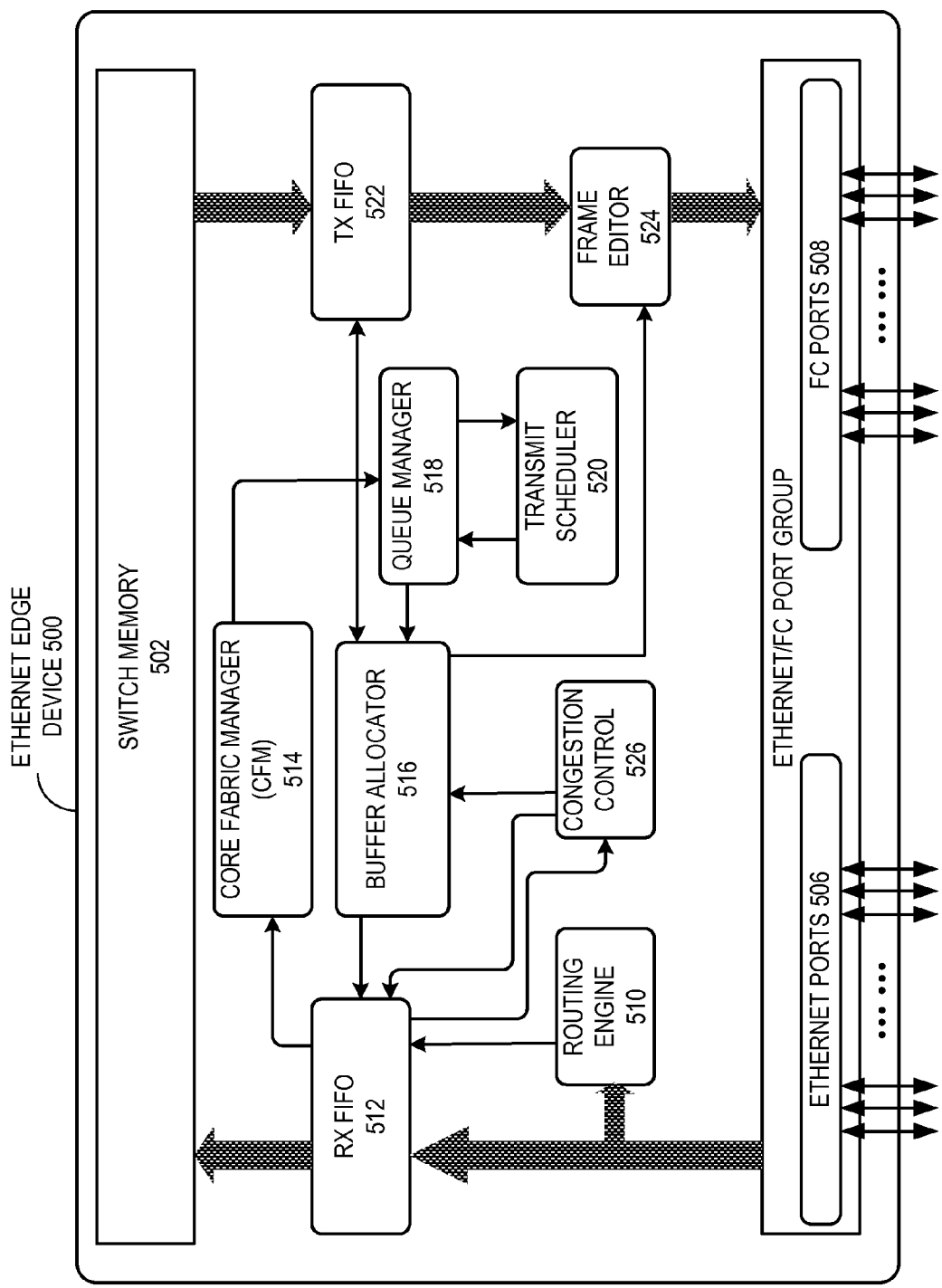
FIG. 5 illustrates an exemplary architecture of an edge device which facilitates transmission buffer under-run protection, in accordance with an embodiment of the present invention.

FIG. 5 illustrates an exemplary architecture of an edge device which facilitates transmission buffer under-run protection, in accordance with an embodiment of the present invention. In this example, an edge device 500 includes a set of Ethernet-based external ports 506 and a set of FC-based fabric ports 508. Note that fabric ports 508 can also be based on other frame formats. Also included in edge device 500 is a main switch memory 502, a routing engine 510, a receiver first-in-first-out (FIFO) queue 512, a core fabric manager (CFM) 514, a buffer allocator 516, a congestion controller 526, a queue manager 518, a transmit scheduler 520, a transmit FIFO queue 522, and a frame editor 524.

When a frame arrives either from an external port or a fabric port, the header information is extracted from the frame and fed into a routing engine 510, which determines how to forward the frame. The received frame is then temporarily staged in receiver FIFO queue 512. When intra-frame idle primitives are detected, the partially received frame is temporarily stored and the CRC computation is suspended. Reception of the frame is resumed after the intra-frame idle primitives have been received. Meanwhile, congestion controller 526 manages link level credits and monitors the usage of receiver FIFO queue. Congestion controller 526 can maintain the buffer status in one or more registers. Congestion controller 526 also reports the buffer status to buffer allocator 516. Buffer allocator 516 is responsible for maintaining a pool of free buffer identifiers and servicing buffer-allocation and de-allocation requests from main switch memory 502 and queue manager 518. Buffer allocator 516 also manages the queuing and de-queuing in receiver FIFO queue 512 and transmit FIFO queue 522.

After the frame received from a fabric port enters receiver FIFO queue 512, CFM 514 re-orders the frames based on their respective sequence number, ingress edge device, priority, and external egress port.

With reference to FIG. 5, after a received frame is de-queued from receiver FIFO queue 512, the frame is sent to main switch memory 502. Switch memory 502 provides the cross-bar interconnect and facilitates low-latency switching between the 28 ports (12 external ports and 16 fabric ports). In one embodiment, switch memory 502 can provide temporary storage for frames while routing engine 510 decides the destination of the frame and while queue manager 518 and transmit scheduler 520 prepare to transmit the frame on the egress port. After the frame is processed by switch memory 502, it enters the transmit FIFO queue 522. Subsequently, the frame is de-queued from transmit FIFO queue 522 and is edited by frame editor 524. Frame editor 524 is responsible for adding additional header information to a frame when the frame is to be FC-encapsulated, or removing the header information from a frame when the frame is to be de-capsulated.

Transmit FIFO queue 522 also monitors its state, and when the amount of data for a frame is below a threshold, it can notify frame editor 524. In response, frame editor 524 inserts intra-frame idle primitives after the last bit is retrieved from transmit FIFO queue 522. While the intra-frame idle primitives are transmitted, transmit FIFO queue 522 continues to receive the rest of the frame. After the rest of the frame is received, frame editor 524 discontinues the transmission of intra-frame idle primitives and resumes transmission of the frame.

The examples presented herein are for illustration purposes only and should not limit the scope of this disclosure. In general, embodiments of the present invention provide a new type of switching systems which facilitate transmission buffer under-run protection by inserting intra-frame idle primitives into a partially transmitted data frame. Such a novel switching system can provide more expedited data transfer with significantly reduced frame dropping rate.

The methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them. The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method performed by a switching device, comprising:
    associating a first portion of data frame with an output port prior to receiving a remaining portion of the data frame in a transmission buffer;
    inserting continuously a number of predetermined intra-frame bit sequences indicating at least one idle period until receiving the remaining portion of the data frame in the transmission buffer; and
    associating the remaining portion of the data frame with the output port from the transmission buffer.

2. The method of claim 1, further comprising determining a potential buffer under-run in response to the amount of data in the transmission buffer being below a predetermined threshold.

3. The method of claim 1, wherein the transmission buffer is a first-in-first-out (FIFO) buffer; and
    wherein the method further comprises fetching the data frame from a central shared memory.

4. The method of claim 1, further comprises encapsulating the data frame based on a Fibre Channel (FC) frame format.

5. The method of claim 1, further comprising:
    attaching a sequence number to the data frame; and
    preventing the predetermined intra-frame bit sequence from intersecting the sequence number.

6. The method of claim 1, further comprising associating the remaining portion of the data frame with the output port after sufficient data is received at the transmission buffer.

7. The method of claim 1, further comprising:
    associating a high-priority data frame with the output port after the predetermined intra-frame bit sequences and before associating the remaining portion of the interrupted data frame with the output port; and associating the interrupted data frame with the output port in response to the high-priority data frame not being in the transmission buffer.

8. A method in a switching device, comprising:
identifying one or more continuou predetermined intra-frame bit sequences indicating at least one idle period in received bits for a first portion of a data frame;
temporarily suspending error-checking calculation for the data frame in response to identifying the predetermined intra-frame bit sequences; and
resuming the error-checking calculation for the data frame in response to identifying a received bit sequence for the data frame which is not the predetermined intra-frame bit sequence, wherein the received bit sequence corresponds to a remaining portion of the data frame.

9. The method of claim 8, further comprising:
receiving a beginning-of-frame bit sequence after the identified predetermined intra-frame bit sequence(s), wherein the beginning-of-frame bit sequence corresponds to a high-priority frame which is different from the data frame whose error-checking calculation is suspended; and
receiving the high-priority data frame prior to resuming the error-checking calculation of the suspended data frame.

10. An apparatus, comprising:
a transmission module operable to associate a first portion of a data frame with an output port prior to receiving a remaining portion of the data frame in a transmission buffer;
an insertion module operable to continuously insert a number of predetermined intra-frame bit sequences indicating at least one idle period until receiving the remaining portion of the data frame in the transmission buffer; and
wherein the transmission module is further operable to associate the remaining portion of the data frame with the output port from the transmission buffer.

11. The apparatus of claim 10, further comprising a monitoring module operable to determine a potential buffer under-run in response to the amount of data in the transmission buffer being below a predetermined threshold.

12. The apparatus of claim 10, wherein the transmission buffer is a first-in-first-out (FIFO) buffer configured to fetch the data frame from a central shared memory.

13. The apparatus of claim 10, further comprising an encapsulation module operable to encapsulate the data frame based on an FC frame format.

14. The apparatus of claim 10, further comprising:
a frame editing module operable to attach a sequence number to the data frame; and
wherein the insertion module is operable to prevent the predetermined intra-frame bit sequence from intersecting the sequence number.

15. The apparatus of claim 10, wherein the transmission module is further operable to associating the remaining portion of the data frame with the output port after sufficient data is received at the transmission buffer.

16. The apparatus of claim 10, wherein the transmission module is further operable to:
assocaite a high-priority data frame with the output port after the predetermined intra-frame bit sequences and before associating the remaining portion of the interrupted data frame with the output port; and
associating the interrupted data frame with output port in response to the high-priority data frame not being in the transmission buffer.

17. An apparatus, comprising:
a bit-sequence identification module operable to identify one or more continuous predetermined intra-frame bit sequences indicating at least one idle period in received bits for a first portion of a data frame;
a suspension module operable to temporarily suspend error-checking calculation for the data frame in response to identifying the predetermined intra-frame bit sequences; and
an error-checking module operable to resume the error-checking calculation for the data frame in response to identifying a received bit sequence for the data frame which is not the predetermined intr-frame bit sequence, wherein the received bit sequence corresponds to a remaining portion of the data frame.

18. The apparatus of claim 17, further comprising a receiving module operable to:
receive a beginning-of-frame bit sequence after the identified predetermined intra-frame bit sequence(s), wherein the beginning-of-frame bit sequence corresponds to a high-priority frame which is different from the data frame whose error-checking is suspended; and
receive the high-priority data frame prior to resuming the error-checking of the suspended data frame.

19. A switching system including an edge device and a core switching device, wherein the edge device comprises:
a transmission module operable to associate a first portion of a data frame with an output port prior to receiving a remaining portion of the data frame in a transmission buffer; and
an insertion module configurable to continuously insert a number of predetermined intra-frame bit sequences indicating at least one idle period until receiving the remaining portion of the data frame in the transmission buffer;
wherein the transmission module is further operable to assocaite the remaining portion of the data frame with the output port from the transmission buffer in response to receiving the remaining portion of the data frame.

20. The switching system of claim 19, wherein the edge device further comprises a monitoring module operable to determine a potential buffer under-run in response to the amount of data in the transmission buffer being below a predetermined threshold.

21. The switching system of claim 19, wherein the transmission buffer is a first-in-first-out (FIFO) buffer configured to fetch the data frame from a central shared memory.

22. The switching system of claim 19, wherein the core switching device is a Fibre Channel (FC) switch; and
wherein the edge device further comprises an encapsulation module operable to encapsulate the data frame based on an FC frame format.

23. The switching system of claim 19, wherein the edge device further comprises a frame editing module operable to attach a sequence number to the data frame; and
wherein the insertion module is operable to prevent the predetermined intra-frame bit sequence from intersecting the sequence number.

24. The switching system of claim 19, wherein the transmission module is further operable associate the remaining portion of the data frame with the output port after sufficient data is received at the transmission buffer.

25. The switching system of claim 19, wherein the edge device further comprises a preemption module operable to:

assocaite a high-priority data frame with the output port after the predetermined intra-frame bit sequences and before assocaiting the end of the interrupted data frame with the output port; and the remaining portion of the interrupted data frame with the output port in response to the high-priority data frame not being in the transmission buffer.

26. The switching system of claim 19, wherein the core switching device comprises:
 a bit-sequence identification module operable to identify one or more continuous predetermined intra-frame bit sequences indicating at least one idle period in received bits for a first portion of the data frame;
 a suspension module operable to temporarily suspend error-checking calculation for the data frame in response to identifying the predetermined intra-frame bit sequences; and
 an error-checking module operable to resume the error-checking calculation for the data frame in response to identifying a received bit sequence for the data frame which is not the predetermined intra-frame bit sequence, wherein the received bit sequence corresponds to a remaining portion of the data frame.

27. The switching system of claim 26, wherein the core switching device comprises a receiving module operable to:
 receive a beginning-of-frame bit sequence after the identified predetermined intra-frame bit sequence(s), wherein the beginning-of-frame bit sequence corresponds to a high-priority frame which is different from the data frame whose error-checking is suspended; and
 receive the high-priority data frame prior to resuming the error-checking of the suspended data frame.

\* \* \* \* \*

UNITED STATES PATENT AND TRADEMARK OFFICE
CERTIFICATE OF CORRECTION

| | | |
|---|---|---|
| PATENT NO. | : 8,751,881 B1 | |
| APPLICATION NO. | : 12/614243 | |
| DATED | : June 10, 2014 | |
| INVENTOR(S) | : John M. Terry et al. | |

It is certified that error appears in the above-identified patent and that said Letters Patent is hereby corrected as shown below:

In the Claims

In claim 8 (at column 11, line 5), please correct the word "continuou" to "continuous" so the line reads:

--identifying one of more continuous predetermined intra- --

In claim 16 (at column 11, line 65), please add the word "the" so the line reads:

--associating the interrupted data frame with the output port in--

In claim 19 (at column 12, line 37), please correct the word "assocaite" to "associate" so the line reads:

--associate the remaining portion of the data frame with--

In claim 24 (at column 12, line 63), please add the word "to" so the line reads:

--mission module is further operable to associate the remaining--

In claim 25 (at column 13, line 1), please correct the word "assocaite" to "associate" so the line reads:

--associate a high-priority data frame with the output port--

In claim 25 (at column 13, line 3), please correct the word "assocaiting" to "associating" so the line reads:

--before associating the end of the interrupted data frame--

In claim 25 (at column 13, line 5), please add the word "associate" so the line reads:

--associate the remaining portion of the interrupted data frame with the--

<div style="text-align:right">

Signed and Sealed this
Twenty-fourth Day of February, 2015

Michelle K. Lee
*Deputy Director of the United States Patent and Trademark Office*

</div>